United States Patent
La Roche et al.

(10) Patent No.: US 10,673,649 B2
(45) Date of Patent: Jun. 2, 2020

(54) METHOD AND DEVICE FOR QUALITY OF SERVICE REGULATION

(71) Applicant: Cisco Technology, Inc., San Jose, CA (US)

(72) Inventors: Humberto Jose La Roche, Ocean, NJ (US); Desmond Joseph O'Connor, London (GB)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/791,603

(22) Filed: Oct. 24, 2017

(65) Prior Publication Data

US 2019/0123935 A1    Apr. 25, 2019

(51) Int. Cl.
*H04W 88/16* (2009.01)
*H04L 12/46* (2006.01)
(Continued)

(52) U.S. Cl.
CPC ...... *H04L 12/4633* (2013.01); *H04L 41/0893* (2013.01); *H04L 41/0896* (2013.01);
(Continued)

(58) Field of Classification Search
CPC ............. H04L 12/4633; H04L 12/4604; H04L 12/4641; H04L 43/0888; H04L 45/00;
(Continued)

(56) References Cited

U.S. PATENT DOCUMENTS 7,421,487 B1 * 9/2008 Peterson ................. H04L 12/66
709/220
7,852,840 B2 * 12/2010 Le Roux ............. H04L 12/4633
370/228

(Continued)

FOREIGN PATENT DOCUMENTS

WO    2013044730 A1    4/2013

OTHER PUBLICATIONS

Technical Specification, "3rd Generation Partnership Project; Technical Specification Group Services and System Aspects; General Packet Radio Service (GPRS) enhancements for Evolved Universal Terrestrial Radio Access Network (E-UTRAN) access (Release 14)", 3GPP TS 23.401 V14.5.0, Sep. 2017, pp. 1-100.

(Continued)

*Primary Examiner* — Jean A Gelin

(57) ABSTRACT

In accordance with various implementations, a method is performed at a gateway with one or more processors, non-transitory memory, and a data interface. The method includes: obtaining a request to instantiate a tunnel for data from a guest service provider (GSP) to a user device that traverses an operator network; determining whether the request satisfies tunneling criteria, where the tunneling criteria at least includes a first criterion associated with intrinsic information associated with the operator network and a second criterion associated with extrinsic information that characterizes network resources of the network operator based on a relationship between the operator network and the GSP; instantiating the tunnel in response to determining (Continued)

that the request satisfies the tunneling criteria, where instantiating the tunnel includes the gateway transmitting tunnel instructions to other nodes of the operator network; and routing the data through the tunnel to transmit the data to the user device.

20 Claims, 9 Drawing Sheets

(51) Int. Cl.
*H04L 12/24* (2006.01)
*H04L 12/26* (2006.01)
*H04W 84/04* (2009.01)

(52) U.S. Cl.
CPC .......... *H04L 41/5051* (2013.01); *H04L 43/08* (2013.01); *H04L 41/5019* (2013.01); *H04W 84/042* (2013.01); *H04W 88/16* (2013.01)

(58) Field of Classification Search
CPC ...... H04L 47/20; H04W 28/24; H04W 24/02; H04W 28/0268; H04W 28/16
See application file for complete search history.

(56) References Cited

U.S. PATENT DOCUMENTS

| | | | | |
|---|---|---|---|---|
| 8,572,219 B1* | 10/2013 | Shigapov | ............ | H04L 63/0272 455/419 |
| 8,971,258 B2 | 3/2015 | Marocchi et al. | | |
| 9,614,772 B1* | 4/2017 | Bradfield | ............ | H04L 47/2441 |
| 2003/0110276 A1* | 6/2003 | Riddle | ................ | H04L 41/083 709/230 |
| 2004/0156313 A1* | 8/2004 | Hofmeister | ......... | H04L 12/4633 370/229 |
| 2004/0218607 A1* | 11/2004 | Hurtta | .................. | H04L 47/14 370/395.21 |
| 2007/0070958 A1* | 3/2007 | Rinne | .................. | H04L 47/824 370/338 |
| 2007/0121615 A1* | 5/2007 | Weill | ................. | H04L 12/4633 370/389 |
| 2009/0028141 A1* | 1/2009 | Vu Duong | .............. | H04L 45/50 370/389 |
| 2010/0017861 A1* | 1/2010 | Krishnaswamy | ..... | H04W 48/18 726/7 |
| 2012/0124660 A1* | 5/2012 | Wang | ................ | H04L 12/4641 726/12 |
| 2013/0279335 A1* | 10/2013 | Ahmadi | ............ | H04W 28/0205 370/235 |
| 2013/0287012 A1* | 10/2013 | Pragada | ................ | H04W 76/25 370/338 |
| 2013/0311640 A1* | 11/2013 | Gleixner | ................. | H04W 4/70 709/224 |
| 2014/0006347 A1* | 1/2014 | Qureshi | ................. | G06F 21/10 707/621 |
| 2014/0010072 A1* | 1/2014 | Gandhi | ................. | H04L 47/724 370/228 |
| 2014/0029436 A1* | 1/2014 | Boc | ........................ | H04W 8/082 370/236 |
| 2014/0036785 A1 | 2/2014 | Li et al. | | |
| 2014/0056141 A1* | 2/2014 | Breternitz, Jr. | ......... | H04L 49/10 370/235 |
| 2014/0153489 A1* | 6/2014 | Perras | .................... | H04W 60/00 370/328 |
| 2015/0085664 A1 | 3/2015 | Sachdev et al. | | |
| 2015/0103670 A1 | 4/2015 | Wu et al. | | |
| 2015/0109967 A1 | 4/2015 | Hogan et al. | | |
| 2016/0105838 A1* | 4/2016 | Wang | .................... | H04W 28/12 370/329 |
| 2016/0234124 A1* | 8/2016 | Tomici | ................. | H04W 28/24 |
| 2016/0330748 A1* | 11/2016 | Bindrim | ............ | H04L 65/1013 |
| 2016/0353459 A1 | 12/2016 | Chun | | |
| 2017/0155590 A1* | 6/2017 | Dillon | ................. | H04L 43/0888 |
| 2017/0303189 A1* | 10/2017 | Hampel | ................ | H04W 48/20 |
| 2018/0077024 A1* | 3/2018 | Zhang | ................... | H04L 41/044 |
| 2018/0124080 A1* | 5/2018 | Christodorescu | ... | H04L 63/1425 |
| 2018/0270160 A1* | 9/2018 | Munoz De La Torre Alonso | ....... | H04W 28/0215 |
| 2018/0302951 A1* | 10/2018 | Christopherson | ..... | H04W 88/10 |

OTHER PUBLICATIONS

Technical Specification, "3rd Generation Partnership Project; Technical Specification Group Services and System Aspects; General Packet Radio Service (GPRS) enhancements for Evolved Universal Terrestrial Radio Access Network (E-UTRAN) access (Release 14)", 3GPP TS 23.401 V14.5.0, Sep. 2017, pp. 101-200.
Technical Specification, "3rd Generation Partnership Project; Technical Specification Group Services and System Aspects; General Packet Radio Service (GPRS) enhancements for Evolved Universal Terrestrial Radio Access Network (E-UTRAN) access (Release 14)", 3GPP TS 23.401 V14.5.0, Sep. 2017, pp. 201-300.
Technical Specification, "3rd Generation Partnership Project; Technical Specification Group Services and System Aspects; General Packet Radio Service (GPRS) enhancements for Evolved Universal Terrestrial Radio Access Network (E-UTRAN) access (Release 14)", 3GPP TS 23.401 V14.5.0, Sep. 2017, pp. 301-393.
Technical Specification, "3rd Generation Partnership Project; Technical Specification Group Services and System Policy and charging control architecture (Release 15)", 3GPP TS 23.203 V15.0.0, Sep. 2017, pp. 1-100.
Technical Specification, "3rd Generation Partnership Project; Technical Specification Group Services and System Policy and charging control architecture (Release 15)", 3GPP TS 23.203 V15.0.0, Sep. 2017, pp. 101-257.
Technical Specification, "3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 14)", 3GPP TS 29.274 V14.5.0, Sep. 2017, pp. 1-100.
Technical Specification, "3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 14)", 3GPP TS 29.274 V14.5.0, Sep. 2017, pp. 101-200.
Technical Specification, "3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 14)", 3GPP TS 29.274 V14.5.0, Sep. 2017, pp. 201-300.
Technical Specification, "3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 14)", 3GPP TS 29.274 V14.5.0, Sep. 2017, pp. 301-372.
Technical Report, "3rd Generation Partnership Project; Technical Specification Group Services and System Aspects; Study on S8 Home Routing Architecture for VoLTE (Release 14)", 3GPP TR 23.749 V14.0.0, Jun. 2016, 38 pages.
"IMS Roaming and Interworking Guidelines", Version 22.0, Oct. 11, 2016, GSM Association, Official Document IR.65—IMS Roaming and Interworking Guidelines, 55 pages.
"IMS Service Centralization and Continuity Guidelines", Version 14.0, Dec. 8, 2016, GSM Association, Official Document IR.64—IMS Service Centralization and Continuity Guidelines, 24 pages.
"Mobile Infrastructure Sharing", https://www.gsma.com/publicpolicy/wp-content/.../Mobile-Infrastructure-sharing.pdf, downloaded from the internet Feb. 9, 2019, 48 pages.

(56) References Cited

OTHER PUBLICATIONS

International Search Report and Written Opinion in counterpart International Application No. PCT/US2018/056812, dated Mar. 1, 2019, 11 pages.

* cited by examiner

METHOD AND DEVICE FOR QUALITY OF SERVICE REGULATION

TECHNICAL FIELD

The present disclosure generally relates to content delivery, and in particular, to systems, methods, and devices for quality of service regulation.

BACKGROUND

Mobile network operators (MNOs) manage wireless communications services for end user subscribers. Such services include, but are not limited to, radio spectrum allocation, wireless network infrastructure, and Quality of Service (QoS) parameters. On the other hand, guest service providers (GSPs), for example, do not have access to certain radio spectrum resources or have a complete infrastructure in place.

As such, the MNOs supplement GSPs so that the GSPs are able to provide their own wireless communications services. Typically, QoS has been under-managed and under-utilized by MNOs due to a lack of policy management enforcement tools necessary to accommodate GSPs such as mobile virtual network operators (MVNOs), enterprises, application providers, roaming partner service providers, or the like.

Additionally, MNOs share active and passive radio access system infrastructure such as base stations and network gateways. With several MNOs vying for use of the existing infrastructure, radio frequency (RF) resources are easily abused in a host MNO by demanding more RF resources than allowed.

DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
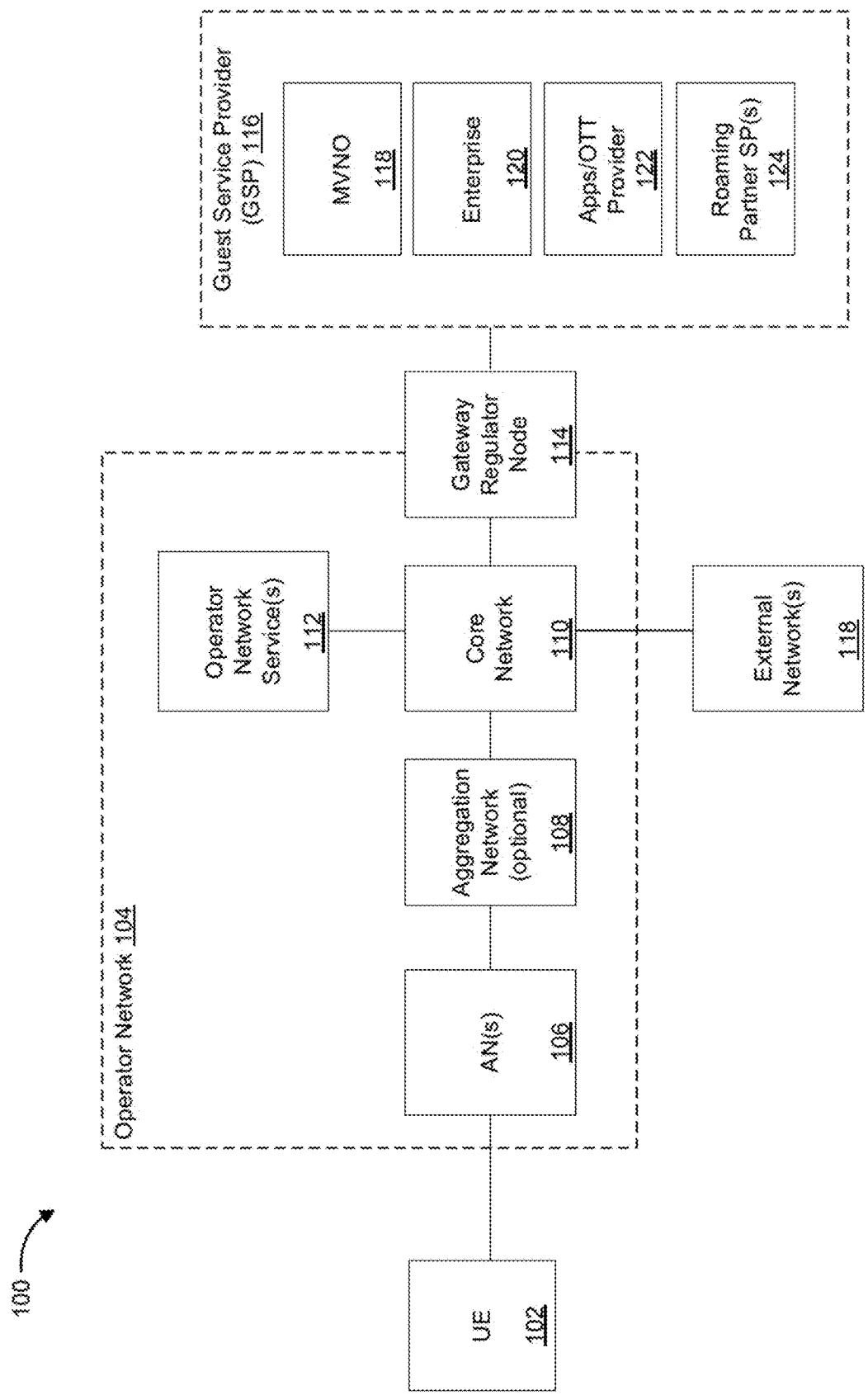
FIG. 1 is a block diagram of an example data delivery environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Various implementations disclosed herein include devices, systems, and methods for QoS regulation. For example, in some implementations, a method is performed at a gateway node with one or more processors, non-transitory memory, and a data interface. The method includes obtaining a request to instantiate a tunnel for a data flow from a guest service provider to a user device that traverses an operator network. The method also includes determining whether the request satisfies tunneling criteria, where the tunneling criteria at least includes a first criterion associated with intrinsic information associated with the operator network and a second criterion associated with extrinsic information that quantitatively characterizes network resources of the network operator allocated to the guest service provider based on a predefined relationship between the operator network and the guest service provider. The method further includes instantiating the tunnel for the data flow between the operator network and the guest service provider in response to determining that the request satisfies the tunneling criteria, where instantiating the tunnel for the data flow includes the gateway node transmitting tunnel instructions to other nodes of the operator network. The method further includes routing the data flow through the tunnel in order to transmit the data flow to the user device.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

EXAMPLE EMBODIMENTS

QoS associated with MNOs has been under-managed and under-utilized by guest service providers (GSPs) due to lack of policy management enforcement tools necessary to accommodate mobile virtual network operators (MVNOs), enterprises, application providers, roaming partner service providers, or the like.

This invention deals with the MNO's ability to manage and process QoS requests to its radio access network (RAN) from application and service partners who are not part of the MNO's internal trusted application set. The invention safely allows an GSP to control radio frequency (RF) resources (e.g., spectral usage) in a host network by introducing a QoS-regulator feature in the host network that acts as a gatekeeper/policy enforcer for QoS requests. Implementations of a proposed solution described herein include devices, systems, and methods for QoS regulation.

FIG. 1 is a block diagram of an example data delivery environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the data delivery environment 100 includes an operator network 104 that receives and transmits data between user equipment (UE) 102 and a guest service provider (GSP) 116. In some implementations, the operator network 104 also receives data from and transmits data to one or more external networks 118.

In some implementations, the UE 102 includes a suitable combination of hardware (physical or virtualized), software, and/or firmware. As will be appreciated by one of ordinary skill in the art, although FIG. 1 depicts one UE 102, the data delivery environment 100 includes an arbitrary number of UEs in various other implementations. For example, the UE 102 corresponds to a desktop computer, laptop computer, mobile phone, tablet, wearable computing device, set-top box (STB), over-the-top (OTT) box, gaming console, or the like.

In some implementations, the operator network 104 includes one or more access networks (ANs) 106, a core network 110, one or more operator network services 112, and a gateway regulator node 114. In some implementations, the operator network 104 optionally includes an aggregation network 108. In some implementations, the operator network 104 corresponds to a telecommunications service provider that provides wireless communication functionalities to a user/subscriber associated with the UE 102 such as a mobile network operator (MNO) that provides mobile access to content and communications. In some implementations, the operator network 104 corresponds more generally to a service provider (SP) that provides mobile access, fixed access, satellite access, or the like to content and communications.

In some implementations, the operator network 104 also receives and transmits data to one or more external networks 118, which optionally includes receiving data from and transmitting data to the Internet, content delivery network (CDN) servers, application servers, or the like.

In some implementations, at least one of the one or more ANs 106 implements radio access technology to provide connectivity via wireless communication to the UE 102 communicatively connected to the operator network 104. In one example, at least one of the one or more ANs 106 corresponds to a Long-Term Evolution (LTE) mobile access network (sometimes also referred to as 4G) that includes evolved node B (eNodeB) access nodes and the like. In another example, at least one of the one or more ANs 106 correspond to a 5G mobile access network that includes 5G base stations and the like.

In some implementations, at least one of the one or more ANs 106 implements non-radio access technology to provide connectivity via wired or wireless communication to the UE 102 communicatively connected to the operator network 104. For example, the non-radio access technology includes an IEEE 802.11x Wi-Fi network, a fiber optic network, an IEEE 802.3x Ethernet network, or the like.

In some implementations, at least one of the one or more ANs 106 implements heterogeneous access technology via wired or wireless communication to the UE 102 communicatively connected to the operator network 104. For example, the heterogeneous access technology includes a combination of radio access and non-radio access technologies.

In some implementations, the core network 110 provides internet protocol (IP) routing and forwarding for a data flow between end points. For example, the end points include the one or more operator network services 112, the one or more external networks 118, the gateway regulator node 114, or the like.

In some implementations, the one or more operator network services 112 include wireless communication services to control the elements of the operator network 104 in order to monitor and deliver services to an end user (e.g., the UE 102). As one example, the one or more operator network services 112 optionally include radio spectrum allocation management, infrastructure and networking management, QoS policy enforcement, billing services, customer support services, security auditing services, infrastructure and networking maintenance, and/or the like. In another example, the one or more operator network services 112 include content delivery services such as an IP multimedia subsystem (IMS). In yet another example, the one or more operator network services 112 include communication services such as voice-over Long-Term Evolution (VoLTE) or voice-over Internet Protocol (VoIP).

In some implementations, the aggregation network 108 combines multiple network connections in parallel to increase throughput and to provide redundancies in case one of the network connections should fail.

In some implementations, the operator network 104 includes the gateway regulator node 114 that serves as an interface node between the operator network 104 and the guest service provider 116. In some implementations, the gateway regulator node 114 includes a suitable combination of hardware (physical or virtualized), software, and/or firmware to maintain communication protocols between the operator network 104 and the guest service provider 116. For example, the gateway regulator node 114 is configured to translate and map gateway interconnects for networks with different protocol technologies by performing protocol conversions. Further, in another example, the networks with different protocol technologies include the operator network 104 and the guest service provider 116.

In some implementations, the guest service provider 116 corresponds to one of an MVNO 118, an enterprise 120, an applications/OTT provider 122, one or more roaming partner SPs 124, or the like. In some implementations, the guest service provider 116 is not affiliated with the operator network 104. In one example, the guest service provider 116 does not include policy management.

For example, the MVNO 118 corresponds to a telecommunications service provider that has an agreement with the operator network 104 to provide its subscribers with telecommunications capabilities using the infrastructure of the operator network 104. For example, the enterprise 120 corresponds to a telecommunications service provider that provides consulting, system integration, software development, outsourcing and/or the like. For example, the applications/OTT provider 122 corresponds to a telecommunications service provider that delivers one or more services across an IP network without requiring its users to subscribe to a traditional service provider. For example, the one or more roaming partner SPs 124 correspond to one or more telecommunications service providers that have cooperative agreements to grant subscribers local access to the network.

Figure 2:
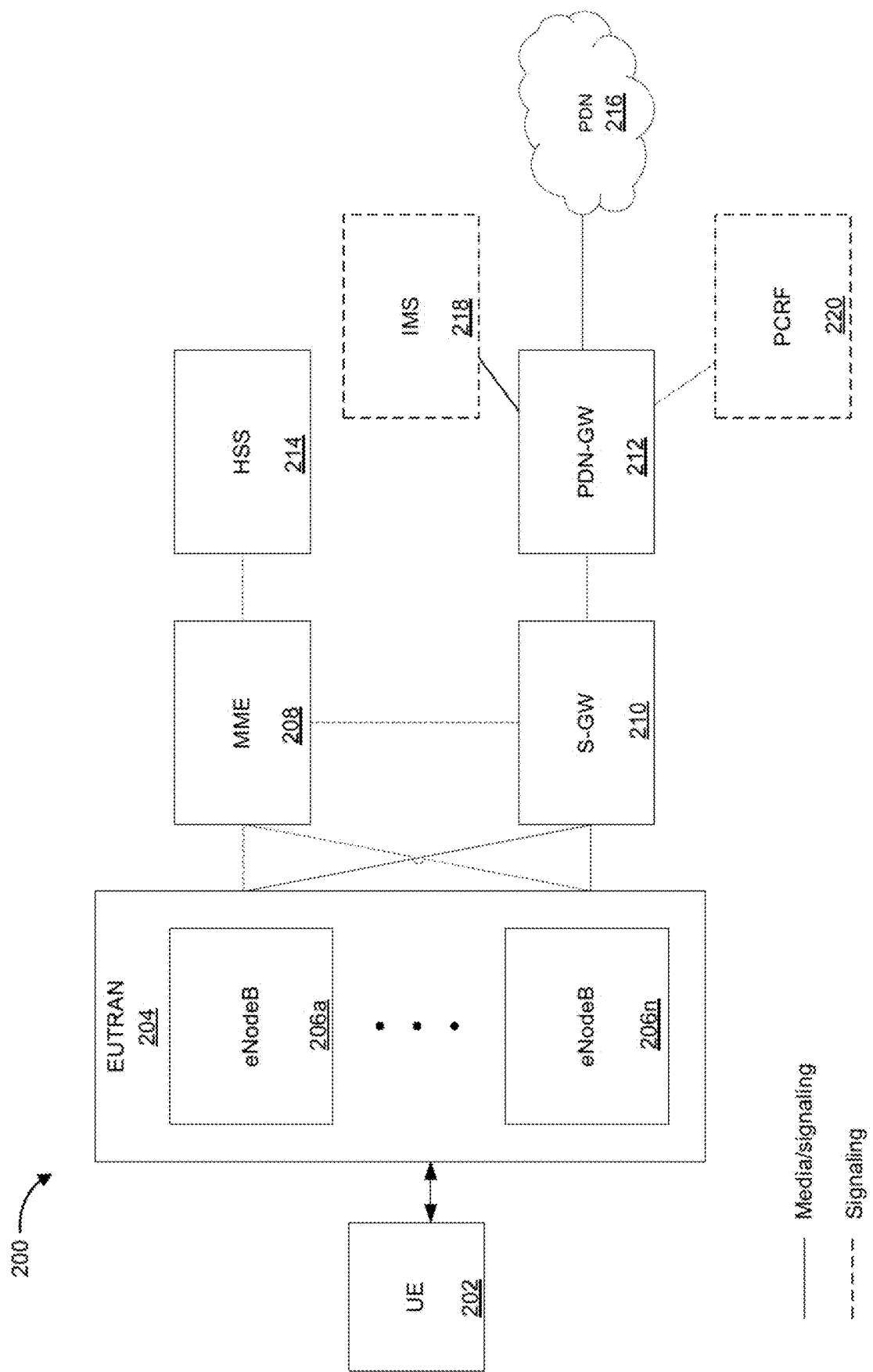
FIG. 2 is a block diagram of an example operator network in accordance with some implementations.

FIG. 2 is a block diagram of an example operator network 200 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operator network 200 corresponds to an operator network with a long-term evolution (LTE) architecture, sometimes simply called a 4G architecture. The operator network 200 communicates with a user equipment (UE) 202 (e.g., the UE 102 of FIG. 1). According to some implementations, as shown in FIG. 2, the operator network 200 includes an evolved universal mobile telecommunication system (UMTS) terrestrial radio access network (EUTRAN) 204 that includes one or more evolved node-Bs (eNodeBs) 206a, . . . , 206n, a mobility management entity (MME) 208, a serving-gateway (S-GW) 210, a packet data network gateway (PDN-GW) 212, a home subscriber server (HSS) 214, and a packet data network (PDN) 216. According to some implementations, the operator network 200 optionally includes an IP multimedia subsystem (IMS) 218. According to some implementations, the operator network 200 also optionally includes a policy and charging rules function (PCRF) 220.

In some implementations, the EUTRAN 204 corresponds to a RAN that includes one or more eNodeBs 206a, . . . , 206n and provides a communication pathway between the UE 202 and the MME 208 or the S-GW 210. eNodeBs 206a, . . . , 206n correspond to access nodes that provide communications between the EUTRAN 204 and the UE 202. According to some implementations, the EUTRAN 204 is configured to operate similarly to one of the one or more ANs 106 in FIG. 1.

In some implementations, the MME 208 is configured to initiate paging and authentication of the mobile device (e.g., the UE 202). The MME 208 retains the location information for each user and selects the appropriate gateway. In some implementations, the MME 208 connects with a respective one of the one or more eNodeBs 206a, . . . , 206n. Further, in some implementations, the MME 208 also communicates with the HSS 214 which serves as a master user database that supports the IMS network entities that handle calls and sessions.

In some implementations, the EUTRAN 204 communicates with the S-GW 210 and sends packets of data (e.g., video, audio, and/or the like) through the S-GW 210 to the PDN-GW 212. Further, in some implementations, the PDN-GW 212 is configured to be the point of interconnect between the external IP networks (e.g., the PDN 216) and routes packets of data to and from the PDN 216. In some implementations, the S-GW 210 communicates with the MME 208 to access user information to determine the appropriate gateway to transmit packets of data. As will be appreciated by one of ordinary skill in the art, although FIG. 2 depicts one PDN 216, the operator network 200 includes an arbitrary number of PDNs in various other implementations. In some implementations, the PDN-GW 212 optionally communicates with IMS 218 and PCRF 220.

In some implementations, the operator network 200 optionally includes the IMS 218 which is configured to control and deliver multimedia communications (e.g., video, audio, messages, and/or the like) across a data network.

In some implementations, the operator network 200 optionally includes the PCRF 220 which manages policy decisions and operator-defined charging rules associated with the data flow. For example, policy decisions and charging rules are based at least in part by QoS setting information for a user session, data flow detection, policy enforcement, flow-based charging, and/or the like.

Figure 3:
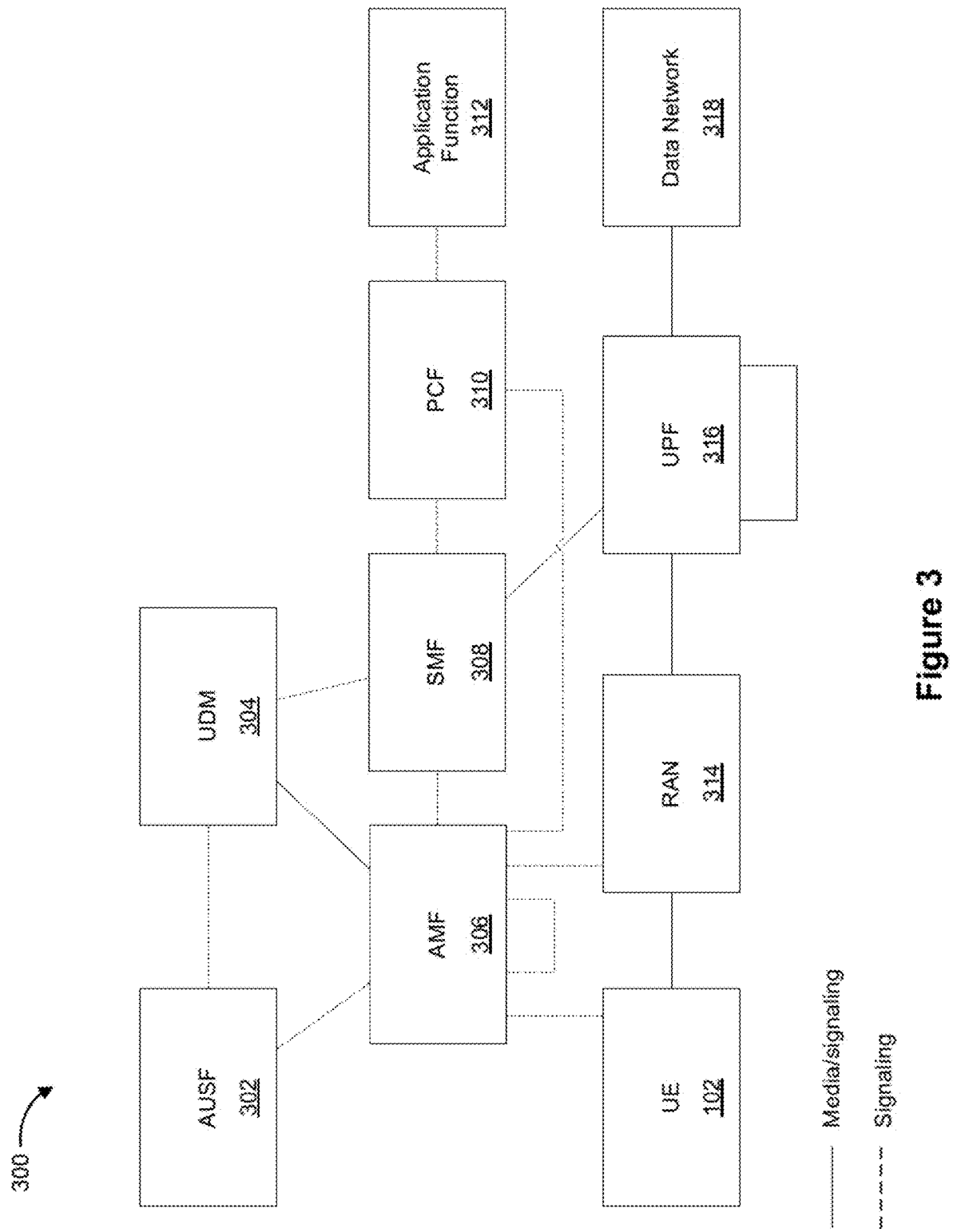
FIG. 3 is a block diagram of an example operator network in accordance with some implementations.

FIG. 3 is a block diagram of an example operator network 300 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operator network 300 corresponds to an operator network with a 5G architecture. According to some implementations, as shown in FIG. 3, the operator network 300 includes a user equipment (UE) (e.g., the UE 102 in FIG. 1), an authentication server function (AUSF) module 302, a unified data management (UDM) module 304, a core access and mobility management function (AMF) module 306, a session management function (SMF) module 308, a policy control function (PCF) module 310, an application function module 312, a RAN 314, a user plane function (UPF) module 316, and a data network 318.

In some implementations, the AUSF 302 is configured to facilitate authentication of an entity that attempts to access a network. As shown in FIG. 3, the AUSF 302 is communicatively coupled to the UDM 304 and the AMF 306. For example, the AUSF 302 is configured to perform security and privacy processes, such as data isolation between network slices, encryption/decryption, and/or the like.

In some implementations, the UDM 304 is configured to create a unified development and delivery environment that provides the UE 102 with access to consistent, accurate, and timely data. As shown in FIG. 3, the UDM 304 is communicatively coupled to the AUSF 302, the AMF 306, and the SMF 308.

In some implementations, the AMF 306 is configured to initiate paging and authentication of the mobile device (e.g., the UE 102). As shown in FIG. 3, the AMF 306 is communicatively coupled to the UE 102, the RAN 314, the AUSF 302, and the UDM 304. In some implementations, the AMF 306 is a user-plane function that includes mobile management capabilities. For example, the AMF 306 is configured to operate similarly to the MME 208 in FIG. 2.

In some implementations, the SMF 308 is configured to provide users/subscribers an option to save and restore sessions. As shown in FIG. 3, the SMF 308 is communicatively coupled to the UDM 304, the AMF 306, the PCF 310, and the UPF 316. For example, the SMF 308 is configured to save and restore one or more initial states associated with one or more applications. Further, for example, the initial states include the name of an open file, a displayed image, a video in progress, and/or the like.

In some implementations, the PCF 310 is configured to determine policy rules in a multimedia network. As shown in FIG. 3, the PCF 310 is communicatively coupled to the AMF 306, the SMF 308, and the application function module 312. For example, the PCF 310 designates policy in real-time via software.

In some implementations, the application function module 312 is configured to perform quality control for specific applications operating within a network. As shown in FIG. 3, the application function module 312 is communicatively coupled to the PCF 310. For example, quality control corresponds to evaluating QoS related to performance.

In some implementations, the RAN 314 implements radio access technology to provide connectivity via wireless communication to the UE 102 connected to the operator network 300. For example, the RAN 314 corresponds to a 5G mobile access network where the RAN 314 includes 5G base stations and the like. According to some implementations, the RAN 314 is configured to operate similarly to one of the one or more ANs 106 in FIG. 1. As shown in FIG. 3, the RAN 314 is communicatively coupled to the UE 102, the AMF 306, and the UPF 316.

In some implementations, the UPF 316 is configured to carry the traffic in the operator network 300. As shown in FIG. 3, the UPF is communicatively coupled to the RAN 314, the SMF 308, and the data network 318. In some implementations, the UPF 316 forwards traffic to a next-hop along the path to the selected destination data network (e.g., the data network 318). In some implementations, the data plane packets are transmitted through a delivery node (e.g., a router, a switch, and/or the like). To that end, the delivery node is configured to dispose of incoming and outgoing packets.

In some implementations, the data network 318 includes a router, switches, and/or the like. In some implementations, the data network 318 provides IP routing and forwarding for packets between end points. For example, the data network 318 corresponds to a portion of an operator network (e.g., the core network 110 of the operator network 104 in FIG. 1).

Figure 4:
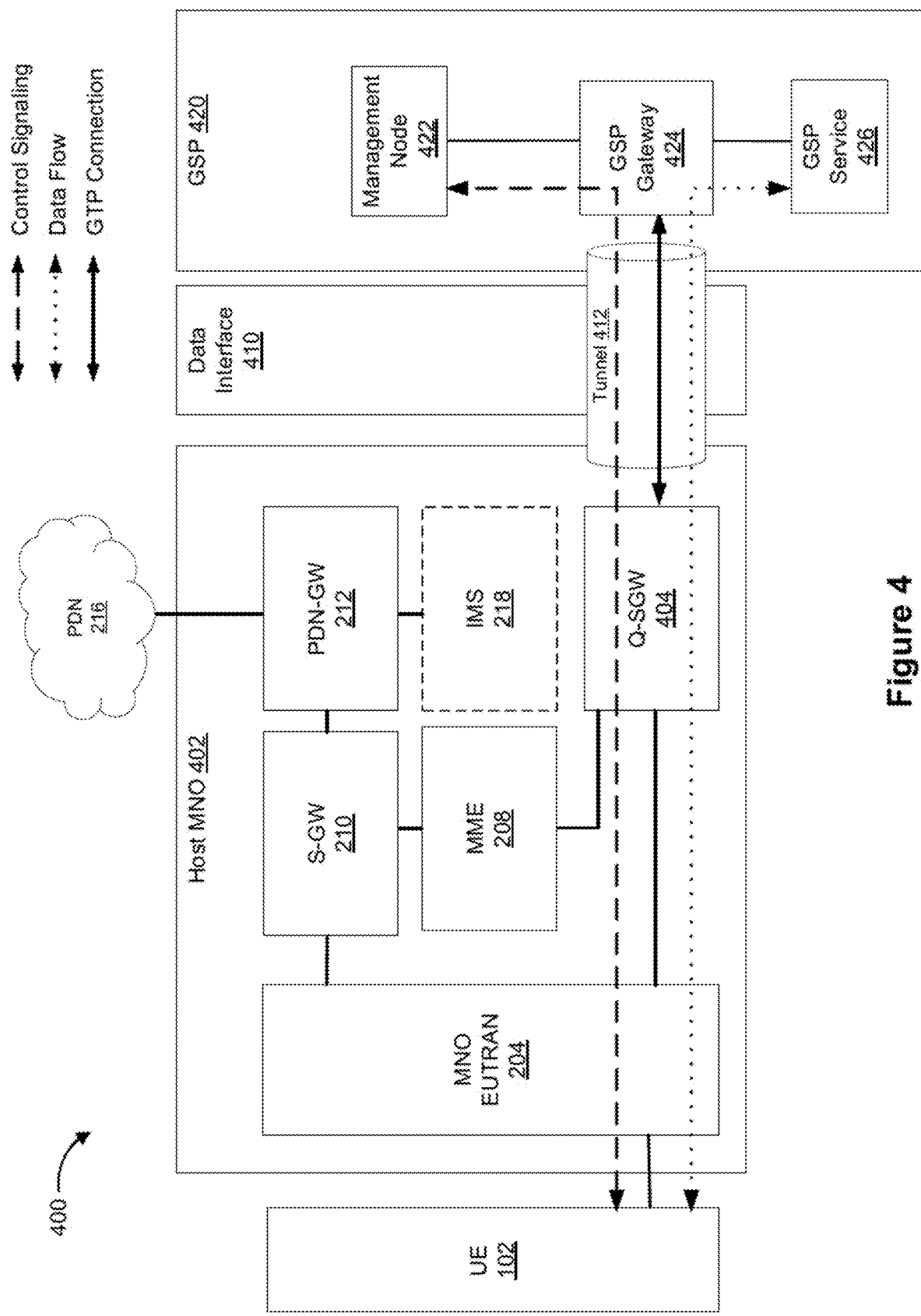
FIG. 4 is a block diagram of a host-client environment in accordance with some implementations.

FIG. 4 is a block diagram of a host-client environment 400 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. Elements common to FIGS. 2 and 4 include common reference numbers, and only the differences between FIGS. 2 and 4 are described herein for the sake of brevity. To that end, as a non-limiting example, the host-client environment 400 includes a UE 102, a host MNO 402, a data interface 410, a tunnel 412, a guest service provider (GSP) 420, and a packet data network (PDN) 216. In some implementations, the host-client environment 400 utilizes an LTE mobile access network.

As shown in FIG. 4, the host MNO 402 includes an MNO EUTRAN 204, a serving gateway (S-GW) 210, a packet data network gateway (PDN-GW) 212, a mobility management entity (MME) 208, and a Q-serving gateway (Q-SGW) 404. In some implementations, the host MNO 402 optionally includes an IP multimedia subsystem (IMS) 218. In one example, the host MNO 402 corresponds to the operator network 104 in FIG. 1 or the operator network 200 in FIG. 2.

In some implementations, the Q-SGW 404 is configured to intercept data flows associated with QoS requests between the host MNO 402 and the GSP 420. For example, the Q-SGW 404 is configured to serve as a gatekeeper/policy enforcement node for QoS requests at the host MNO 402. In another example, the Q-SGW 404 inspects session requests based on information derived in the MME 208 to determine whether to instantiate the tunnel 412.

In some implementations, the data interface 410 corresponds to an IP interconnect between access networks. For example, the data interface 410, includes a GPRS tunneling protocol (GTP) connection, a UMTS connection, and/or the like.

In some implementations, the tunnel 412 is instantiated across the data interface 410 to communicatively couple the host MNO 402 and the GSP 420. For example, the tunnel 412 corresponds to an S8 Home Routed (S8HR) interface. In some implementations, the tunnel 412 is configured to carry data and control signals across the data interface 410. In one example, the tunnel 412 is configured to carry one of a GTP connection, or the like.

In some implementations, the GSP 420 includes a management node 422, an GSP gateway 424, and an GSP service 426. For example, the GSP 420 corresponds to the guest service provider 116 in FIG. 1. Further, in another example, the GSP 420 corresponds to one of an MVNO 118, an enterprise 120, an application/OTT provider 122, one or more roaming partners 124, or the like.

In some implementations, the management node 422 is configured to manage UE information and facilitate communications at the GSP gateway 424. For example, with reference to FIG. 2, the management node 422 includes the home subscriber server (HSS) 214, the policy and charging rules function (PCRF) 220, and/or the like.

In some implementations, the GSP gateway 424 is configured to be the point of interconnect between the external IP networks within the GSP 420 and routes packets of data via the tunnel 412.

In some implementations, the GSP service 426 corresponds to a service platform that allows the GSP 420 to manage usage and spectral resources. For example, the GSP service 426 corresponds to a VoLTE service, VoIP service, an application, or the like. In one example, with reference to FIG. 1, the GSP service 426 corresponding to the enterprise 120 includes consulting, system integration, software development, outsourcing, and/or the like. In another example, with continued reference to FIG. 1, the GSP service 426 corresponding to the application/OTT provider 122 includes wireless connectivity to user devices while accessing a cellular infrastructure from an MNO (e.g., the host MNO 402).

Figure 5:
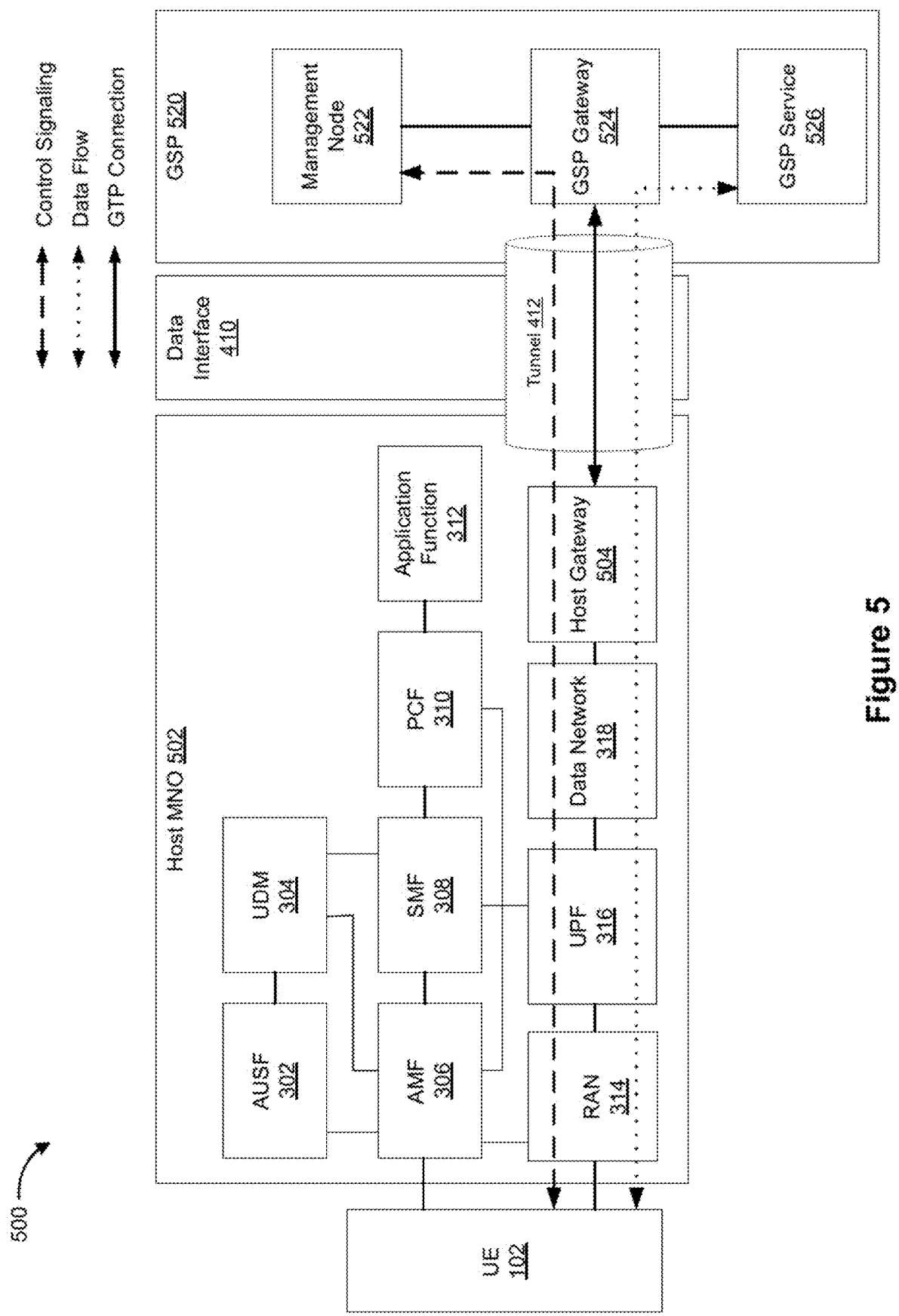
FIG. 5 is a block diagram of a host-client environment in accordance with some implementations.

FIG. 5 is a block diagram of a host-client environment 500 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. Elements common to FIGS. 3, 4, and 5 include common reference numbers, and only the differences between FIGS. 3, 4, and 5 are described herein for the sake of brevity. To that end, as a non-limiting example, the host-client environment 500 includes a UE 102, a host MNO 502, a data interface 410, a tunnel 412, and an intermediate client service provider (GSP) 520. In some implementations, the host-client environment 500 utilizes a 5G mobile access network.

As shown in FIG. 5, the host MNO 502 includes an AUSF 302, a UDM 304, an AMF 306, an SMF 308, a PCF 310, an application function 312, a RAN 314, a UPF 316, a data network 318, and a host gateway 504. In one example, the host MNO 502 corresponds to the operator network 104 in FIG. 1 or the operator network 300 in FIG. 3.

In some implementations, the host gateway 504 is configured to intercept data flows associated with QoS between the host MNO 402 and the GSP 420. For example, the host gateway 504 is configured to serve as a gatekeeper/policy enforcement node for QoS requests in the host MNO 402. In another example, the host gateway 504 inspects session requests to determine whether to instantiate the tunnel 412. In one example, the host gateway 504 corresponds to the Q-SGW 404 in FIG. 4.

In some implementations, the GSP 520 includes a management node 522, the GSP gateway 524, and an GSP service 526. For example, the GSP 520 corresponds to the guest service provider 116 in FIG. 1. Further, in another example, with reference to FIG. 1, the GSP 520 corresponds to one of an MVNO 118, an enterprise 120, an application/OTT provider 122, one or more roaming partners 124, or the like.

In some implementations, the management node 522 is configured to manage UE information and facilitate communications at the GSP gateway 524. For example, with reference to FIG. 3, the management node 522 includes the unified data management (UDM) 304, the session management function (SMF) 308, the policy control function (PCF) 310, the application function 312, or the like.

In some implementations, the GSP gateway 524 is configured to be the point of interconnect between the external IP networks within the GSP 520 and routes packets of data via the tunnel 412.

In some implementations, the GSP service 526 corresponds to a service platform that allows the GSP to manage usage and spectral resources. For example, the GSP service 526 corresponds to a VoLTE service, VoIP service, an application, or the like. In one example, with reference to FIG. 1, the GSP service 526 corresponding to the enterprise 120 includes consulting, system integration, software development, outsourcing, and/or the like. In another example, with continued reference to FIG. 1, the GSP service 526 corresponding to the application/OTT provider 122 includes wireless connectivity to user devices while accessing a cellular infrastructure from an MNO (e.g., the host MNO 502).

Figure 6:
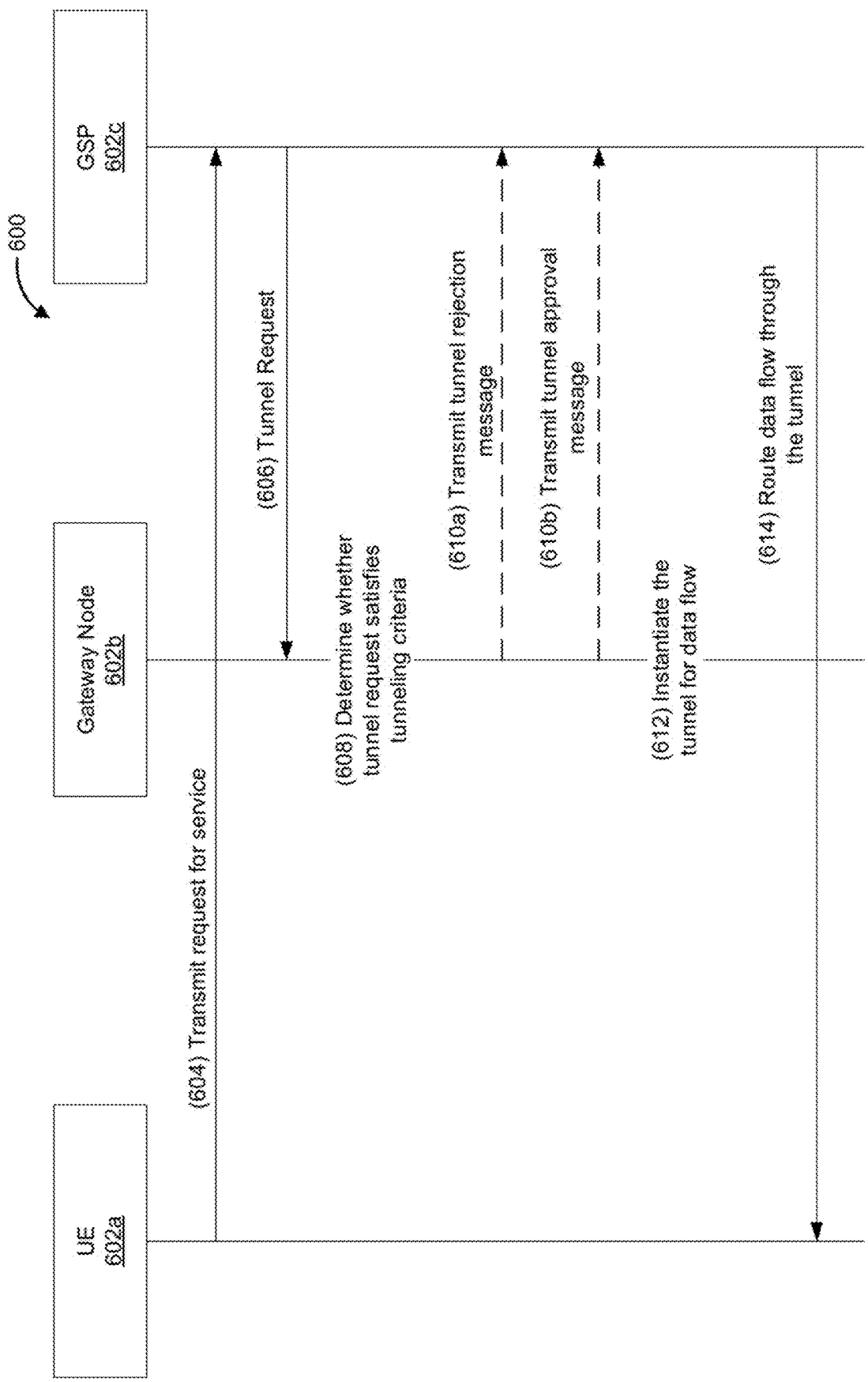
FIG. 6 is a swim lane diagram of a process flow for instantiating a tunnel and routing a data flow through said tunnel in accordance with some implementations.

FIG. 6 is a swim lane diagram of a process flow for instantiating a tunnel and routing a data flow through said tunnel in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the method 600 is associated with a host-client environment (e.g., the host-client environment 400 in FIG. 4, or the host-client environment 500 in FIG. 5). In some implementations, the method 600 is performed at least in part by: a UE 602a (e.g., the UE 102 in FIG. 5 or 6); a gateway node 602b (e.g., the Q-SGW 404 in FIG. 4, or the host gateway 504 in FIG. 5); and a guest service provider (GSP) 602c (e.g., the GSP 420 in FIG. 4, or the GSP 520 in FIG. 5).

In some implementations, the UE 602a transmits (604) a request for service to the GSP 602c. For example, the service corresponds to the GSP service 426 in FIG. 4 or the GSP service 526 in FIG. 5. In some implementations, with reference to FIG. 4, the request for service is transmitted from the UE 102, across the data interface 410, and received at the GSP gateway 424 within the GSP 420. In some implementations, with reference to FIG. 5, the request for service is transmitted from the UE 102, across the data interface 410, and received at the GSP gateway 524 within the GSP 520.

In some implementations, the GSP 602c transmits (606) a tunnel request to the gateway node 602b. In some implementations, the tunnel request corresponds to a request to instantiate a tunnel (e.g., the tunnel 412 in FIGS. 4-5) for a data flow from the GSP 602c to the UE 602a that traverses the operator network (e.g., the host MNO 402 in FIG. 4, or the host MNO 502 in FIG. 5).

In some implementations, the gateway node 602b determines (608) whether the tunnel request satisfies tunneling criteria. In one example, with reference to FIG. 4, the Q-SGW 404 is communicatively coupled to the MME 208 to determine whether the tunnel request satisfies the tunneling criteria. In another example, with reference to FIG. 5, the host gateway 504 determines whether the tunnel request satisfies the tunneling criteria.

In some implementations, the tunneling criteria at least includes a first criterion associated with intrinsic information associated with the operator network (e.g., the host MNO 402 in FIG. 4, or the host MNO 502 in FIG. 5) and a second criterion associated with extrinsic information that quantitatively characterizes network resources of the operator network allocated to the GSP 602c based on a predefined relationship between the operator network and the GSP 602c. In one example, the predefined relationship corresponds to a service level agreement (SLA) between the operator network and the GSP 602c.

In some implementations, the intrinsic information associated with the operator network correspond to a characterization of network resources, including available network resources, reserved/used network resources, total capability of the network resources, and/or the like. In some implementations, the intrinsic information associated with the operator network correspond to at least one of: spectral usage within at least a portion of the operator network, bandwidth usage within at least a portion of the operator network, or proximity of the UE 602a to an access node within the operator network that services the UE 602a. In one example, the spectral usage corresponds to at least one of an overall spectral usage value of the operator network or a spectral usage value associated with a particular access node within the operator network that services the UE 602a. In another example, the access node corresponds to one of a microcell, an access point, a base station, or the like. In another example, the bandwidth usage corresponds to at least one of the overall bandwidth usage of the operator network or the bandwidth usage of the access node within the operator network that services the UE 602a.

In some implementations, the extrinsic information correspond to at least one of: a usage allotment associated with the predefined relationship between the operator network and the GSP 602c, a bandwidth allotment associated with the predefined relationship between the operator network and the GSP 602c, a latency criterion associated with the predefined relationship between the operator network and the GSP 602c, or a QoS criterion associated with the predefined relationship between the operator network and the GSP 602c. In one example, the usage allotment associated with the predefined relationship between the operator network and the GSP 602c correspond to an allotment of resources, including a number of minutes available/used, a number of text messages available/used, and/or the like.

In some implementations, the intrinsic information associated with the operator network and the extrinsic information associated with the operator network are stored in a policy server (e.g., the MME 208 in FIG. 4, or the AMF 306 in FIG. 5).

If the tunnel request does not satisfy the tunneling criteria, the process 600 continues to step 610a. If the tunnel request satisfies the tunneling criteria, the process 600 continues to step 610b.

In some implementations, the gateway node 602b transmits (610a) a tunnel rejection message to the GSP 602c, in response to determining that the tunnel request does not satisfy the tunneling criteria. In some implementations, the rejection message includes a message with the reason/cause for the rejection to the GSP 602c. Further, in some implementations, the tunnel is not instantiated.

In some implementations, the gateway node 602b transmits (610b) a tunnel approval message to the GSP 602c, in response to determining that the tunnel request satisfies the tunneling criteria. In some implementations, the approval message includes a message acknowledging the approval (e.g., ACK), a tunnel identifier, port information, GTP information, and/or the like.

In some implementations, the gateway node 602b instantiates (612) the tunnel for the data flow between the operator network and the GSP 602c in response to determining that the request satisfies the tunneling criteria. In some implementations, the gateway node 602b also transmits tunnel instructions to other nodes of the operator network. In one example, the tunnel instructions include an instruction to forward the data flow to specified ports. In another example, the tunnel instructions include an instruction to remove a GTP tunnel header (e.g., an addressing identifier or a forwarding identifier), one or more transport labels, and/or the like.

In some implementations, the GSP 602c routes (614) a data flow through the tunnel to the UE 602a. In some implementations, routing the data flow through the tunnel corresponds to the operator network transmitting the data flow to the UE 602a via one of an LTE mobile access network or a 5G mobile access network.

Figure 7:
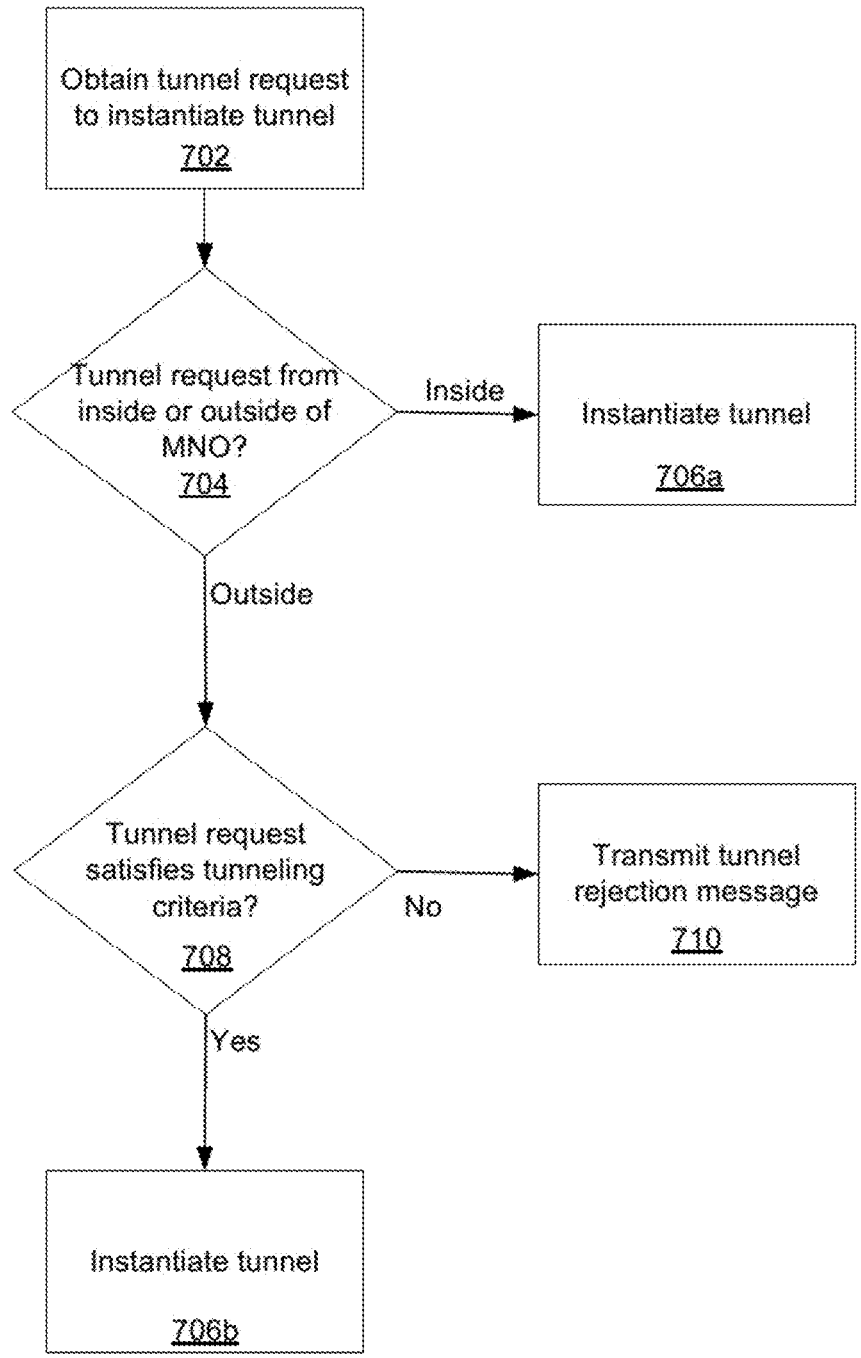
FIG. 7 is a simplified flowchart representation of a method of instantiating a tunnel in accordance with some implementations.

FIG. 7 is a simplified flowchart representation of a method 700 of instantiating a tunnel in accordance with some implementations. In various implementations, the method 700 is performed at a gateway node (e.g., the Q-SGW 404 in FIG. 4, or the host gateway 504 in FIG. 5). While pertinent features are shown, those of ordinary skill in the art will appreciate from the present disclosure that various other features have not been illustrated for the sake of brevity and so as not to obscure more pertinent aspects of the example implementations disclosed herein. To that end, briefly, in some circumstances, the method 700 includes: obtaining a tunnel request to instantiate a tunnel to route data between an GSP and a UE; determining whether the tunnel request is associated with an entity inside or outside of the MNO and determining if the tunnel request satisfies tunneling criteria; and instantiating the tunnel between the GSP and the MNO in response to determining that the tunnel request is associated with an entity outside of the MNO (e.g., the GSP) and in response to determining that the tunnel request satisfies the tunneling criteria.

In some implementations, as represented by block 702, the method 700 includes obtaining a tunnel request to instantiate a tunnel to route data between an GSP and a UE. For example, with reference to FIG. 4, the tunnel request corresponds to a request to instantiate a tunnel (e.g., the tunnel 412 in FIGS. 4-5) for a data flow from the intermediary client service (e.g., the GSP 420 in FIG. 4, or the GSP 520 in FIG. 5) that traverses the operator network (e.g., the host MNO 402 in FIG. 4, or the host MNO 502 in FIG. 5).

In some implementations, as represented by block 704, the method 700 includes determining whether the tunnel request is associated with an entity inside or outside of the MNO. For example, with reference to FIG. 6, the gateway node 602b obtains a tunnel request with respect to step 606.

According to some implementations, in response to determining that the tunnel request is associated with an entity inside of the MNO, the method 700 continues to step 706a. According to some implementations, in response to determining that the tunnel request is associated with an entity outside of the MNO, the method 700 continues to step 708.

In some implementations, as represented by block 706a, the method 700 includes instantiating the tunnel, in response to determining that the tunnel request is associated with an entity inside the MNO. For example, with reference to FIG. 6, the gateway node 602b instantiates the tunnel for the data flow between the operator network and the GSP 602c with respect to step 612.

In some implementations, as represented by block 708, the method 700 includes determining if the tunnel request satisfies tunneling criteria, in response to determining that the tunnel request is associated with an entity outside the MNO. In some implementations, the tunneling criteria at least includes a first criterion associated with intrinsic information associated with the operator network (e.g., the host MNO 402 in FIG. 4 or the host MNO 502 in FIG. 5) and a second criterion associated with extrinsic information that quantitatively characterizes network resources of the operator network allocated to the GSP (e.g., the GSP 420 in FIG. 4, or the GSP 520 in FIG. 5) based on a predefined relationship between the operator network and the GSP. In one example, the predefined relationship corresponds to a service level agreement (SLA) between the operator network and the GSP.

In some implementations, the intrinsic information associated with the operator network correspond to at least one of: spectral usage within at least a portion of the operator network, bandwidth usage within at least a portion of the operator network, or proximity of a UE to an access node within the operator network that services the UE. In one example, the spectral usage corresponds to at least one of an overall spectral usage value of the operator network or the spectral usage value associated with a particular access node within the operator network that services the UE. In another example, the access node corresponds to one of a microcell, an access point, a base station, or the like. In another example, the bandwidth usage corresponds to at least one of the overall bandwidth usage of the operator network or the bandwidth usage of the access node within the operator network that services the UE.

In some implementations, the intrinsic information associated with the operator network correspond to a characterization of network resources, including available network resources, reserved/used network resources, total capability of the network resources, and/or the like.

In some implementations, the extrinsic information correspond to at least one of: a usage allotment associated with the predefined relationship between the operator network and the GSP (e.g., the GSP 420 in FIG. 4, or the GSP 520 in FIG. 5), a bandwidth allotment associated with the predefined relationship between the operator network and the GSP, a latency criterion associated with the predefined relationship between the operator network and the GSP, or a QoS criterion associated with the predefined relationship between the operator network and the GSP. In one example, the usage allotment associated with the predefined relationship between the operator network and the GSP correspond to an allotment of resources, including a number of minutes available/used, a number of text messages available/used, and/or the like.

According to some implementations, in response to determining that the tunnel request does not satisfy the tunneling criteria, the method 700 continues to step 710. According to some implementations, in response to determining that the tunnel request satisfies the tunneling criteria, the method 700 continues to step 706b.

In some implementations, as represented by block 706b, the method 700 includes instantiating the tunnel, in response to determining that the tunnel request satisfies the tunneling criteria. In some implementations, with reference to FIG. 6, the gateway node 602b transmits a tunnel approval message to the GSP 602c, in response to determining that the tunnel request satisfies the tunneling criteria with respect to step 610b. In some implementations, with continued reference to FIG. 6, the gateway node 602b instantiates the tunnel for the data flow between the operator network and the GSP 602c with respect to step 612, in response to determining that the request satisfies the tunneling criteria. In some implementations, the gateway node 602b also transmits tunnel instructions to other nodes of the operator network. In one example, the tunnel instructions include an instruction to forward the data flow to specified ports. In another example, the tunnel instructions include an instruction to remove a GTP tunnel header (e.g., an addressing identifier or a forwarding identifier), one or more transport labels, and/or the like.

In some implementations, as represented by block 710, the method 700 includes transmitting a rejection message to the GSP, in response to determining that the tunnel request does not satisfy the tunneling criteria. In some implementations, with reference to FIG. 6, the gateway node 602b transmits a tunnel rejection message to the GSP 602c with respect to step 610a, in response to determining that the tunnel request does not satisfy the tunneling criteria. In some implementations, the rejection message includes a message with the reason/cause for the rejection to the GSP 602c. Further, in some implementations, the tunnel is not instantiated.

Figure 8:
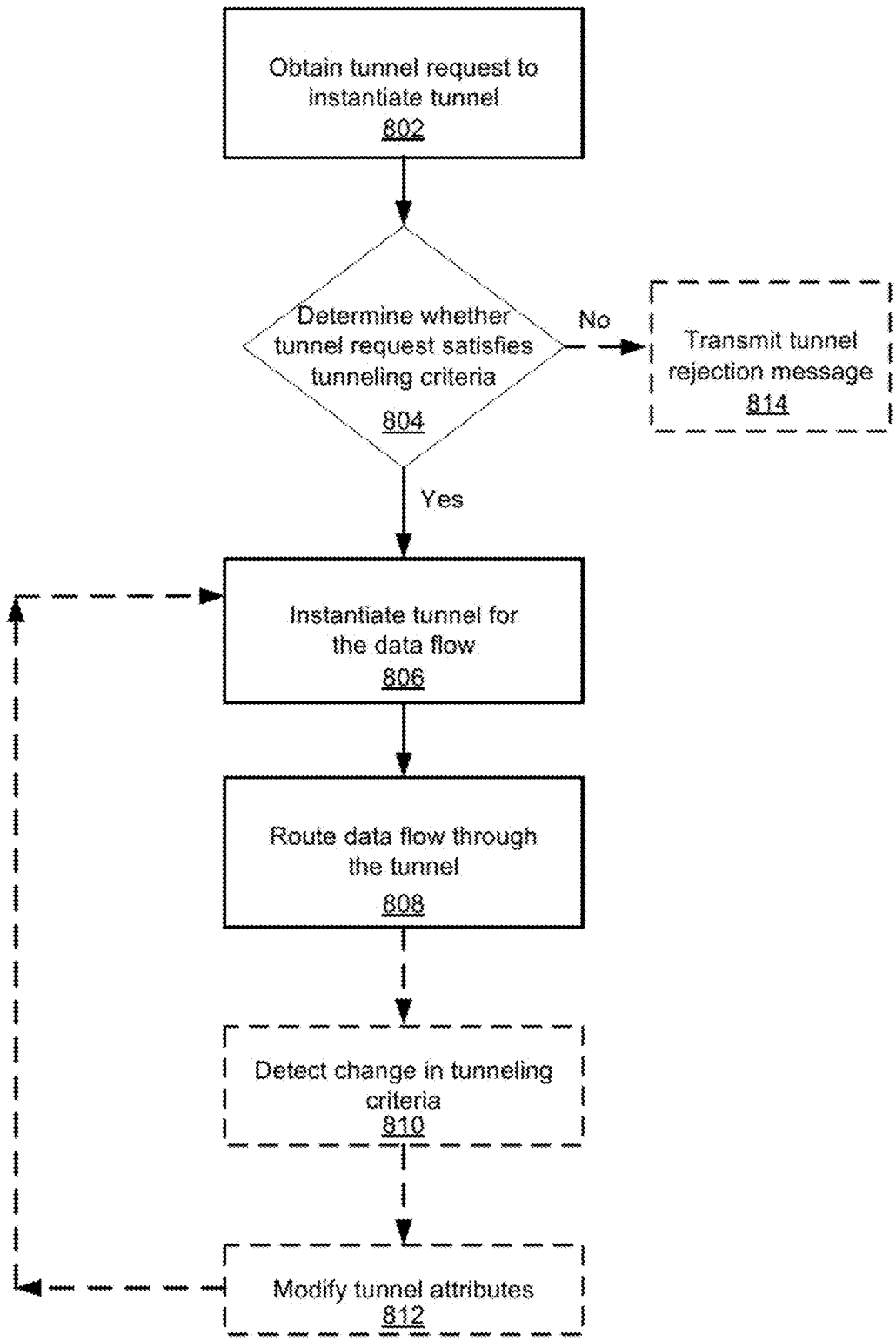
FIG. 8 is a flowchart representation of a method of instantiating a tunnel and routing a data flow through said tunnel in accordance with some implementations.

FIG. 8 is a flowchart representation of a method 800 of instantiating a tunnel and routing a data flow in accordance with some implementations. In various implementations, the method 800 is performed at a gateway node (e.g., the Q-SGW 404 in FIG. 4 or the host gateway 504 in FIG. 5). While pertinent features are shown, those of ordinary skill in the art will appreciate from the present disclosure that various other features have not been illustrated for the sake of brevity and so as not to obscure more pertinent aspects of the example implementations disclosed herein. To that end, briefly, in some circumstances, the method 800 includes: obtaining a tunnel request to instantiate a tunnel; determining if the tunnel request satisfies tunneling criteria; in response to determining that the tunnel request satisfies the tunneling criteria, instantiating the tunnel for a data flow; and routing the data flow through the tunnel. In some implementations, as represented by block 802, the method 800 includes obtaining a tunnel request associated with a guest service provider to instantiate a tunnel. For example, with reference to FIG. 6, the GSP 602c transmits a tunnel request to the gateway node 602b with respect to step 606. In some implementations, the tunnel request corresponds to a request to instantiate a tunnel (e.g., the tunnel 412 in FIGS. 4-5) for a data flow from the GSP 602c to the UE 602a.

In some implementations, as represented by block 804, the method 800 includes determining if the tunnel request satisfies tunneling criteria. In some implementations, the tunneling criteria at least includes a first criterion associated with intrinsic information associated with the operator network (e.g., the host MNO 402 in FIG. 4 or the host MNO 502 in FIG. 5) and a second criterion associated with extrinsic information that quantitatively characterizes network resources of the operator network allocated to the GSP (e.g., the GSP 420 in FIG. 4, or the GSP 520 in FIG. 5) based on a predefined relationship between the operator network and the GSP. In one example, the predefined relationship corresponds to a service level agreement (SLA) between the operator network and the GSP.

In some implementations, the intrinsic information associated with the operator network correspond to at least one of: spectral usage within at least a portion of the operator network, bandwidth usage within at least a portion of the operator network, or proximity of a UE to an access node within the operator network that services the UE. In one example, the spectral usage corresponds to at least one of an overall spectral usage value of the operator network or the spectral usage value associated with a particular access node within the operator network that services the UE. In another example, the access node corresponds to one of a microcell, an access point, a base station, or the like. In another example, the bandwidth usage corresponds to at least one of the overall bandwidth usage of the operator network or the bandwidth usage of the access node within the operator network that services the UE.

In some implementations, the intrinsic information associated with the operator network correspond to a characterization of network resources, including available network resources, reserved/used network resources, total capability of the network resources, and/or the like.

In some implementations, the extrinsic information correspond to at least one of: a usage allotment associated with the predefined relationship between the operator network and the GSP (e.g., the GSP 420 in FIG. 4, or the GSP 520 in FIG. 5), a bandwidth allotment associated with the predefined relationship between the operator network and the GSP, a latency criterion associated with the predefined relationship between the operator network and the GSP, or a QoS criterion associated with the predefined relationship between the operator network and the GSP. In one example, the usage allotment associated with the predefined relationship between the operator network and the GSP correspond to an allotment of resources, including a number of minutes available/used, a number of text messages available/used, and/or the like.

According to some implementations, in response to determining that the tunnel request satisfies the tunneling criteria, the method 800 continues to step 806. According to some implementations, in response to determining that the tunnel request does not satisfy the tunneling criteria, the method 800 continues to step 814.

In some implementations, as represented by block 806, the method 800 includes instantiating the tunnel, in response to determining that the tunnel request satisfies the tunneling criteria. In some implementations, with reference to FIG. 6, the gateway node 602b transmits a tunnel approval message to the GSP 602c with respect to step 610b, in response to determining that the tunnel request satisfies the tunneling criteria. In some implementations, with continued reference to FIG. 6, the gateway 602b instantiates the tunnel for the data flow between the operator network and the GSP 602c with respect to step 612, in response to determining that the request satisfies the tunneling criteria. In some implementations, the gateway node 602b also transmits tunnel instructions to other nodes of the operator network. In one example, the tunnel instructions include an instruction to forward the data flow to specified ports. In another example, the tunnel instructions include an instruction to remove a GTP tunnel header (e.g., an addressing identifier or a forwarding identifier), one or more transport labels, and/or the like.

In some implementations, as represented by block 808, the method 800 includes routing the data flow through the tunnel. For example, with reference to FIG. 6, the GSP 602c routes a data flow through the tunnel to the UE 602a with respect to step 614. In some implementations, routing the data flow through the tunnel corresponds to the operator network transmitting the data flow to the UE 602a via one of an LTE mobile access network or a 5G mobile access network.

In some implementations, as represented by block 810, the method 800 optionally includes detecting a change in the tunneling criteria. In some implementations, the gateway node (e.g., the Q-SGW 404 in FIG. 4, or the host gateway 504 in FIG. 5) monitors the intrinsic information associated with the operator network in order to dynamically change the tunnel and/or its attributes in response to changes to the intrinsic information. For example, the changes to the intrinsic information includes one of an increased distance between the UE and the access node, an increased spectral usage, an increased bandwidth usage, or the like. In another example, the tunnel attributes correspond to a tunnel bandwidth, a tunnel encryption scheme, a tunnel protocol, one or more ports, and/or the like.

In some implementations, the gateway node (e.g., the Q-SGW 404 in FIG. 4, or the host gateway 504 in FIG. 5) also monitors the extrinsic information associated with the predefined relationship between the operator network and the guest service provider in order to dynamically change the tunnel and/or its attributes in response to changes to the extrinsic information. For example, the changes to the extrinsic information includes one of approaching a usage allotment, approaching a bandwidth allotment, or the like.

In some implementations, as represented by block 812, the method 800 optionally includes modifying one or more tunnel attributes of the tunnel for the data flow in response to detecting a change to at least one of the intrinsic information or the extrinsic information. For example, modifying the one or more tunnel attributes includes changing to a different tunnel protocol (e.g., a GTP connection, a Gateway-to-Gateway Protocol connection, an IP version 6 (IPv6) connection, or the like). In some implementations, once the one or more tunnel attributes are modified, the method 800 optionally proceeds to block 806.

In some implementations, as represented by block 814, the method 800 includes transmitting a rejection message to the GSP, in response to determining that the tunnel request does not satisfy the tunneling criteria. In some implementations, with reference to FIG. 6, the gateway node 602b transmits a tunnel rejection message to the GSP 602c, in response to determining that the tunnel request does not satisfy the tunneling criteria. In some implementations, the rejection message includes a message with the reason/cause for the rejection to the GSP 602c. Further, in some implementations, the tunnel is not instantiated.

Figure 9:
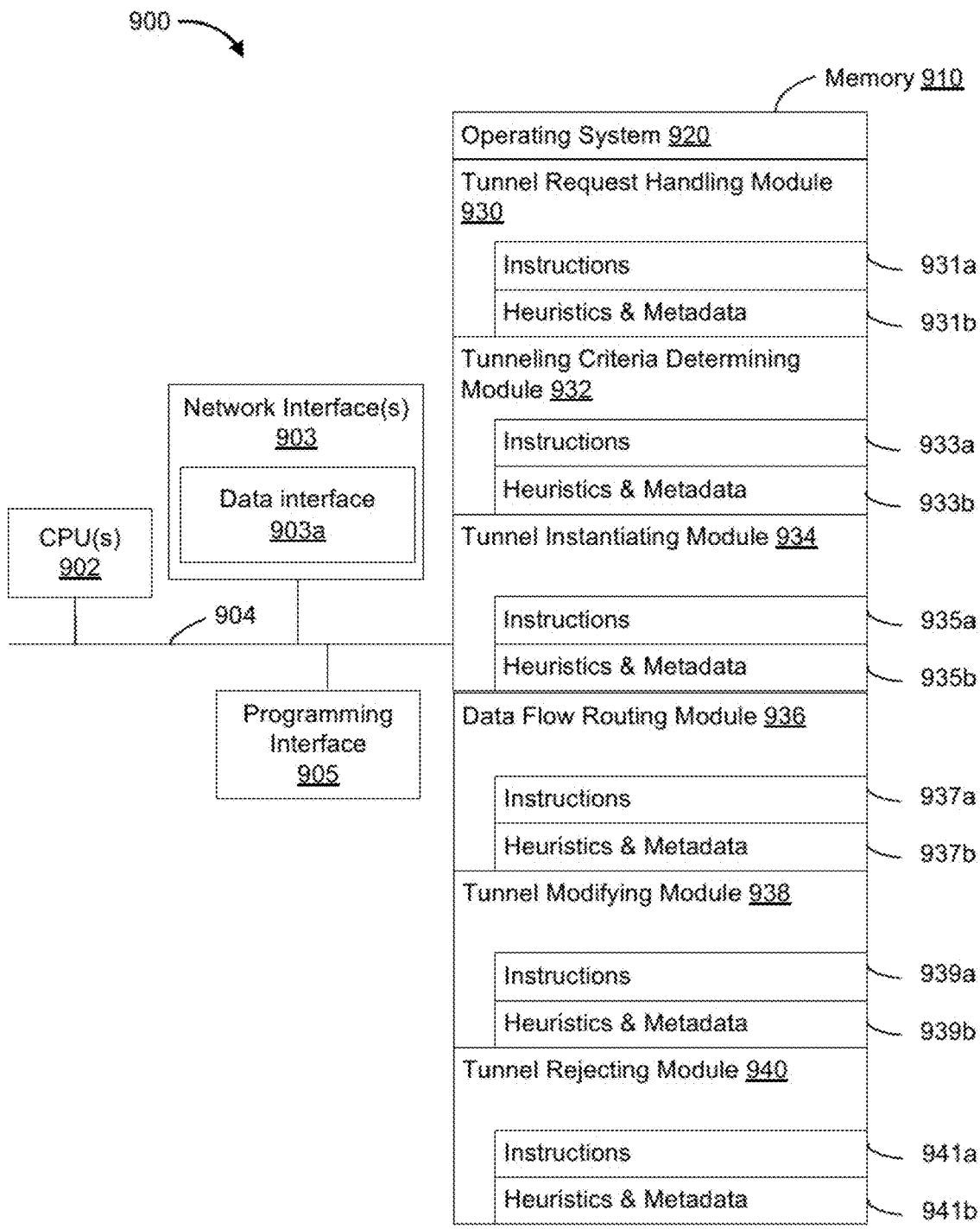
FIG. 9 is a block diagram of an example device in accordance with some implementations.

FIG. 9 is a block diagram of an example device 900 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, the device 900 corresponds to a gateway node, such as the gateway node 114 in FIG. 1, the Q-SGW 404 in FIG. 4, or the host gateway 504 in FIG. 5. In some implementations, the device 900 includes one or more processing units (CPUs) 902, one or more network interfaces 903, one or more programming interface 905, a memory 910, and one or more communication buses 904 for interconnecting these and various other components.

In some implementations, the one or more communication buses 904 include circuitry that interconnects and controls communications between system components. In some implementations, the one or more network interfaces 903 includes one or more data interfaces 903a for obtaining (e.g., receiving and/or retrieving) data flows.

The memory 910 includes high-speed random-access memory, such as DRAM, SRAM, DDR RAM, or other random access solid state memory devices. In some implementations, the memory 910 includes non-volatile memory, such as one or more magnetic disk storage devices, optical disk storage devices, flash memory devices, or other non-volatile solid-state storage devices. The memory 910 optionally includes one or more storage devices remotely located from the one or more CPUs 902. The memory 910 comprises a non-transitory computer readable storage medium. In some implementations, the memory 910 or the non-transitory computer readable storage medium of the memory 910 stores the following programs, modules and data structures, or a subset thereof including an optional operating system 920, a tunnel request handling module 930, a tunneling criteria determining module 932, a tunnel instantiating module 934, a data flow routing module 936, a tunnel modifying module 938, and a tunnel rejecting module 940.

The operating system 920 includes procedures for handling various basic system services and for performing hardware dependent tasks.

In some implementations, the tunnel request handling module 930 is configured to obtain a tunnel request (e.g., the Q-SGW 404 in FIG. 4, or the host gateway 504 in FIG. 5). To that end, in various implementations, the tunnel request handling module 930 includes instructions and/or logic 931a, and heuristics and metadata 931b.

In some implementations, the tunneling criteria determining module 932 is configured to determine if the tunnel request satisfies tunneling criteria. In one example, with reference to FIG. 4, the MME 208 inspects the tunnel request to determine whether the tunnel request satisfies the tunneling criteria. In another example, with reference to FIG. 5, the AMF 306 determines whether the tunnel request satisfies the tunneling criteria. To that end, in various implementations, the tunneling criteria determining module 932 includes instructions and/or logic 933a, and heuristics and metadata 933b.

In some implementations, the tunnel instantiating module 934 is configured to instantiate the tunnel for the data flow in response to determining that the tunnel request satisfies the tunneling criteria. To that end, in various implementations, the tunnel instantiating module 934 includes instructions and/or logic 935a, and heuristics and metadata 935b.

In some implementations, the data flow routing module 936 is configured to route the data flow through the tunnel instantiated by the tunnel instantiating module 934. To that end, in various implementations, the data flow routing module 936 includes instructions and/or logic 937a, and heuristics and metadata 937b.

In some implementations, the tunnel modifying module 938 is configured to modify one or more tunnel attributes of the tunnel for the data flow in response to detecting a change to at least one of the intrinsic information or the extrinsic information. To that end, in various implementations, the tunnel modifying module 938 includes instructions and/or logic 939a, and heuristics and metadata 939b.

In some implementations, the tunnel rejecting module 940 is configured to transmit a tunnel rejection message in response to determining that the tunnel request does not satisfy the tunneling criteria. For example, the tunnel rejecting module corresponds to the Q-SGW 404 in FIG. 4, the host gateway 504 in FIG. 5, or the gateway node 602*b* in FIG. 6. To that end, in various implementations, the tunnel rejecting module 940 includes instructions and/or logic 941*a*, and heuristics and metadata 941*b*.

Although the tunnel request handling module 930, the tunnel criteria determining module 932, the tunnel instantiating module 934, the data flow routing module 936, the tunnel modifying module 938, and the tunnel rejecting module 940 are shown as residing on a single device (e.g., the device 900), it should be understood that in other implementations, any combination of the tunnel request handling module 930, the tunnel criteria determining module 932, the tunnel instantiating module 934, the data flow routing module 936, the tunnel modifying module 938, and the tunnel rejecting module 940 reside in separate computing devices.

Moreover, FIG. 9 is intended more as functional description of the various features which be present in a particular implementation as opposed to a structural schematic of the implementations described herein. As recognized by those of ordinary skill in the art, items shown separately could be combined and some items could be separated. For example, some functional modules shown separately in FIG. 9 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a gateway node of an operator network, the gateway node including one or more processors, non-transitory memory, and a data interface:
   obtaining a quality of service request to instantiate a tunnel to communicatively couple the gateway node of the operator network and a gateway node of a guest service provider for a data flow from the guest service provider to a user device that traverses the operator network, wherein the guest service provider is external to the operator network and the operator network comprises one or more access networks to which the user device is connected;
   determining whether the quality of service request satisfies tunneling criteria, wherein the tunneling criteria at least includes a first criterion associated with intrinsic information that corresponds to a characterization of network resources of the operator network and a second criterion associated with extrinsic information that quantitatively characterizes at least one of an allotment or a service criterion of network resources of the operator network that are allocated to the guest service provider based on a predefined relationship between the operator network and the guest service provider;
   instantiating the tunnel to communicatively couple the gateway node of the operator network and the gateway node of the guest service provider for the data flow between the operator network and the guest service provider in response to determining that the quality of service request satisfies the tunneling criteria, wherein instantiating the tunnel for the data flow includes the gateway node of the operator network transmitting tunnel instructions to other nodes of the operator network; and
   routing the data flow through the tunnel in order to transmit the data flow to the user device.

2. The method of claim 1 further comprising, transmitting a tunnel rejection message to the guest service provider in response to determining that the quality of service request does not satisfy the tunneling criteria.

3. The method of claim 1, wherein the intrinsic information associated with the operator network corresponds to at least one of: spectral usage within at least a portion of the operator network, bandwidth usage within at least a portion of the operator network, or proximity of the user device to an access node of at least one access network within the operator network that services the user device.

4. The method of claim 1, wherein the extrinsic information corresponds to at least one of: a usage allotment associated with the predefined relationship between the operator network and the guest service provider, a bandwidth allotment associated with the predefined relationship between the operator network and the guest service provider, a latency criterion associated with the predefined relationship between the operator network and the guest service provider, or a quality of service criterion associated with the predefined relationship between the operator network and the guest service provider.

5. The method of claim 1, wherein the guest service provider corresponds to one of a roaming partner, a mobile virtual network operator, an application provider, or an enterprise.

6. The method of claim 1, wherein routing the data flow through the tunnel corresponds to the operator network transmitting the data flow to the user device via one of an LTE mobile access network or a 5G mobile access network.

7. The method of claim 1 further comprising, modifying one or more tunnel attributes of the tunnel for the data flow in response to detecting a change to at least one of the intrinsic information or the extrinsic information.

8. The method of claim 1, wherein the tunnel for the data flow is instantiated according to a general packet radio service (GPRS) tunneling protocol (GTP).

9. A device of an operator network comprising:
a data interface;
one or more processors;
a non-transitory memory; and
one or more programs stored in the non-transitory memory, which, when executed by the one or more processors, cause the device to:
obtain a quality of service request to instantiate a tunnel to communicatively couple the device of the operator network and a gateway node of a guest service provider for a data flow from the guest service provider to a user device that traverses the operator network, wherein the guest service provider is external to the operator network and the operator network comprises one or more access networks to which the user device is connected;
determine whether the quality of service request satisfies tunneling criteria, wherein the tunneling criteria at least includes a first criterion associated with intrinsic information that corresponds to a characterization of network resources of the operator network and a second criterion associated with extrinsic information that quantitatively characterizes at least one of an allotment or a service criterion of network resources of the operator network that are allocated to the guest service provider based on a predefined relationship between the operator network and the guest service provider;
instantiate the tunnel to communicatively couple the gateway node of the operator network and the gateway node of the guest service provider for the data flow between the operator network and the guest service provider in response to determining that the quality of service request satisfies the tunneling criteria, wherein instantiating the tunnel for the data flow includes the device transmitting tunnel instructions to other nodes of the operator network; and
route the data flow through the tunnel in order to transmit the data flow to the user device.

10. The device of the operator network of claim 9, wherein the one or more programs cause the device of the operator network to transmit a tunnel rejection message to the guest service provider in response to determining that the quality of service request does not satisfy the tunneling criteria.

11. The device of the operator network of claim 9, wherein the intrinsic information associated with the operator network corresponds to at least one of: spectral usage within at least a portion of the operator network, bandwidth usage within at least a portion of the operator network, or proximity of the user device to an access node of at least one access network within the operator network that services the user device.

12. The device of the operator network of claim 9, wherein the extrinsic information corresponds to at least one of: a usage allotment associated with the predefined relationship between the operator network and the guest service provider, a bandwidth allotment associated with the predefined relationship between the operator network and the guest service provider, a latency criterion associated with the predefined relationship between the operator network and the guest service provider, or a quality of service criterion associated with the predefined relationship between the operator network and the guest service provider.

13. The device of the operator network of claim 9, wherein the one or more programs cause the device of the operator network to route the data flow through the tunnel by the operator network transmitting the data flow to the user device via one of an LTE mobile access network or a 5G mobile access network.

14. The device of the operator network of claim 9, wherein the one or more programs cause the device of the operator network to modify one or more tunnel attributes of the tunnel for the data flow in response to detecting a change to at least one of the intrinsic information or the extrinsic information.

15. A non-transitory memory storing one or more programs, which, when executed by one or more processors of a gateway node of an operator network with a data interface, cause the gateway node to:
obtain a quality of service request to instantiate a tunnel to communicatively couple the gateway node of the operator network and a gateway node of a guest service provider for a data flow from the guest service provider to a user device that traverses the operator network, wherein the guest service provider is external to the operator network and the operator network comprises one or more access networks to which the user device is connected;
determine whether the quality of service request satisfies tunneling criteria, wherein the tunneling criteria at least includes a first criterion associated with intrinsic information that corresponds to a characterization of network resources of the operator network and a second criterion associated with extrinsic information that quantitatively characterizes at least one of an allotment or a service criterion of network resources of the operator network that are allocated to the guest service provider based on a predefined relationship between the operator network and the guest service provider;
instantiate the tunnel to communicatively couple the gateway node of the operator network and a gateway node of a guest service provider for the data flow between the operator network and the guest service provider in response to determining that the quality of service request satisfies the tunneling criteria, wherein instantiating the tunnel for the data flow includes the gateway node transmitting tunnel instructions to other nodes of the operator network; and route the data flow through the tunnel in order to transmit the data flow to the user device.

16. The non-transitory memory of claim 15, wherein the one or more programs cause the gateway node of the operator network to transmit a tunnel rejection message to the guest service provider in response to determining that the quality of service request does not satisfy the tunneling criteria.

17. The non-transitory memory of claim 15, wherein the intrinsic information associated with the operator network corresponds to at least one of: spectral usage within at least a portion of the operator network, bandwidth usage within at least a portion of the operator network, or proximity of the user device to an access node of at least one access network within the operator network that services the user device.

18. The non-transitory memory of claim 15, wherein the extrinsic information corresponds to at least one of: a usage allotment associated with the predefined relationship between the operator network and the guest service provider, a bandwidth allotment associated with the predefined relationship between the operator network and the guest service provider, a latency criterion associated with the predefined relationship between the operator network and the guest service provider, or a quality of service criterion associated with the predefined relationship between the operator network and the guest service provider.

19. The non-transitory memory of claim 15, wherein the one or more programs cause the gateway node of the operator network to route the data flow through the tunnel by the operator network transmitting the data flow to the user device via one of an LTE mobile access network or a 5G mobile access network.

20. The non-transitory memory of claim 15, wherein the one or more programs cause the gateway node of the operator network to modify one or more tunnel attributes of the tunnel for the data flow in response to detecting a change to at least one of the intrinsic information or the extrinsic information.

* * * * *